US006072404A

United States Patent [19]

Nolan et al.

[11] Patent Number: 6,072,404

[45] Date of Patent: Jun. 6, 2000

[54] UNIVERSAL GARAGE DOOR OPENER

[75] Inventors: James Nolan, Conifer; Eric Shreve, Louisville, both of Colo.

[73] Assignee: Eaton Corporation, Cleveland, Ohio

[21] Appl. No.: 08/841,291

[22] Filed: Apr. 29, 1997

Related U.S. Application Data

[60] Provisional application No. 60/020,269, Jun. 25, 1996.

[51] Int. Cl.[7] ........................................ H04Q 7/02

[52] U.S. Cl. ........................ 340/825.69; 340/825.72; 340/825.22

[58] Field of Search .................... 340/825.69, 825.72, 340/825.22, 825.63; 455/76; 708/271; 330/293

[56] References Cited

U.S. PATENT DOCUMENTS

| | | | |
|---|---|---|---|
| 4,053,739 | 10/1977 | Miller et al. | 708/271 |
| 4,618,997 | 10/1986 | Imazeki et al. | 455/76 |
| 4,728,905 | 3/1988 | Zhiwei | 330/293 |
| 5,438,328 | 8/1995 | Kweon | 340/825.63 |
| 5,442,340 | 8/1995 | Dykema . | |
| 5,479,155 | 12/1995 | Zeinstra et al. . | |

FOREIGN PATENT DOCUMENTS

| | | | |
|---|---|---|---|
| WO 94/02920 | 2/1994 | WIPO | 340/825.69 |

*Primary Examiner*—Edwin C. Holloway, III

*Attorney, Agent, or Firm*—Fay, Sharpe, Fagan, Minnich & McKee, LLP

[57] ABSTRACT

A universal garage door opener (UGDO) that records and recreates a carrier frequency signal from a wide range of commercially available garage door openers. A receiver portion of the UGDO includes a detector for removing a carrier wave of the received carrier frequency signal. The carrier frequency signal is applied to a frequency synthesizer including a dual modulus prescaler divider chain. The carrier frequency signal is divided down by the divider chain and compared to a divided reference frequency signal to determine the carrier frequency. The dual modulus divider chain starts at a maximum divide ratio, and periodically changes the divide ratio until the divided carrier frequency signal is within a predetermined resolution range of the divided reference frequency signal. A JK flip flop is used to hold a phase detect output signal of the frequency synthesizer indicative of the divided carrier frequency signal. A carrier frequency signal from a variable controlled oscillator is applied to the frequency synthesizer to be divided down by the dual modulus prescaler divider chain. The phase detect output signal from the frequency synthesizer is used to adjust the center frequency of the VCO so that the divided VCO frequency signal conforms to the original carrier frequency signal. The output carrier frequency of the VCO is also applied to an amplifier that is responsive to a modulation signal to modulate the carrier frequency in accordance with the originally stored demodulation signal from the carrier frequency signal.

35 Claims, 5 Drawing Sheets

UNIVERSAL GARAGE DOOR OPENER

This application claims benefit of U.S. Provisional Application Ser. No. 60/020,269, filed Jun. 25, 1996.

BACKGROUND OF THE INVENTION

1. Field of the Invention

This invention relates generally to a universal garage door opener and, more particularly, to a universal garage door opener adaptable to be programmed by a wide range of varying commercial garage door openers.

2. Discussion of the Related Art

As is well known, garage door openers are available that include a transmitter that transmits an encoded radio frequency (RF) signal to be received by a receiver associated with a garage door to remotely open and close the door. Universal garage door openers (UGDO) that are selectively programmable to open and close a wide-range of garage doors equipped with a conventional garage door opener are becoming increasingly popular in connection with modern day vehicles. UGDOs are generally powered by a vehicle electrical system, and are strategically located on the vehicle for convenience and aesthetic purposes. Because there are many different types of conventional garage door openers that use various types of frequency transmission schemes, an effective UGDO must be able to be programmed by the various garage door openers to be desirable in the marketplace. Thus, a UGDO will include receiver circuitry that is responsive to the transmission signal from the conventional garage door opener, and decoder circuitry that decodes and demodulates carrier wave information so that the UGDO can recreate the transmission signal for subsequent use.

The different commercially available conventional garage door openers incorporate different carrier wave modulation techniques to transmit the encoded data from the remote transmitter to the receiver. For example, the well known Stanley and Chamberlain brand garage door openers utilize a pulse code modulation (PWM) scheme transmitted at a relatively low frequency in which the carrier wave is modulated by varying the pulse widths of the signal. The well known Genie brand garage door openers also use PWM where the modulation is frequency shift keyed (FSK) at a relatively high frequency in which data is distinguished by changes in the frequency of the modulation on the carrier wave. In order to be effective, the UGDO must be able to recognize all of the different types of modulation at the different frequencies, and recreate the signals.

U.S. Pat. Nos. 5,442,340 and 5,479,155, both issued to Dykema, disclose UGDO systems that are applicable to be programmed by the well known commercially available garage door openers. Because UGDOs transmit RF signals, they are subject to FCC regulations. The FCC regulations specify a certain maximum field strength at a first frequency limit, another maximum field strength at a second frequency limit, and a linear extrapolation of maximum field strength values between the two frequency limits. Because the Chamberlain and Stanley brand garage door openers operate at a relatively low frequency, and the Genie brand operates at a relatively high frequency, the relative maximum field strength useable under the FCC regulations for the two different transmissions are significantly different. Therefore, the Dykema UGDO incorporates a controllable attenuation circuit to automatically adjust the field strength of the transmitted signal based upon the frequency and duty cycle of the transmitted signal.

Because the Dykema UGDO systems at least incorporate an attenuation circuit to maximize the field strength output at the different frequencies, significant added expense in the attenuation circuitry is required to produce these types UGDOs. Therefore, there is room for improvement in these types of systems that would minimize cost, size, etc.

It is an object of the present invention to provide a universal garage door opener (UGDO) that can be trained by a wide variety of different garage door openers to recreate their transmission signals, and minimize cost, complexity and size when compared with known UGDOs.

SUMMARY OF THE INVENTION

In accordance with the teachings of the present invention, a universal garage door opener is disclosed that is applicable to detect and record the transmission signals from a wide range of commercially available garage door openers so as to subsequently recreate their transmissions to open a garage door. A carrier frequency transmission signal received from the commercial garage door opener transmitter is applied to a detector for removing the carrier wave from the signal to determine the modulation pattern. The carrier frequency signal is also applied to a frequency synthesizer including a dual modulus prescaler divider chain. The carrier frequency signal is divided down by the divider chain, and compared to a divided reference frequency signal to determine the carrier frequency. The dual modulus divider chain starts at a maximum divide ratio, and periodically changes the divide ratio until the divided carrier frequency signal is within a predetermined resolution range of the divided reference frequency signal. A counter value of the number of times the carrier frequency signal was divided is stored as representative of the carrier frequency signal. When the divided carrier frequency signal drops below the divided reference frequency signal, a phase detect output signal of the frequency synthesizer is applied to a microprocessor through a JK flip flop to provide an indication of the divided carrier frequency signal.

When the UGDO is activated to recreate the received carrier frequency transmission signal, the microprocessor applies the value of the counter to the frequency synthesizer. An output signal from a variable controlled oscillator (VCO) is also applied to the frequency synthesizer to be divided down by the dual modulus prescaler divider chain as set by the value in the counter. The divided VCO frequency signal is compared to the divided reference frequency, and the phase detect output signal from the frequency synthesizer is used to adjust the center frequency of the VCO so that the divided VCO frequency signal conforms with the divided down reference frequency to match the original received carrier frequency signal. The output carrier frequency of the VCO is also applied to an amplifier that is responsive to a modulation signal from the microprocessor to modulate the carrier frequency from the VCO in accordance with the originally stored demodulation signal from the carrier frequency signal.

Additional objects, advantages, and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a universal garage door opener is merely exemplary in nature, and is in no way intended to limit the invention or its applications or uses.

Figure 1:
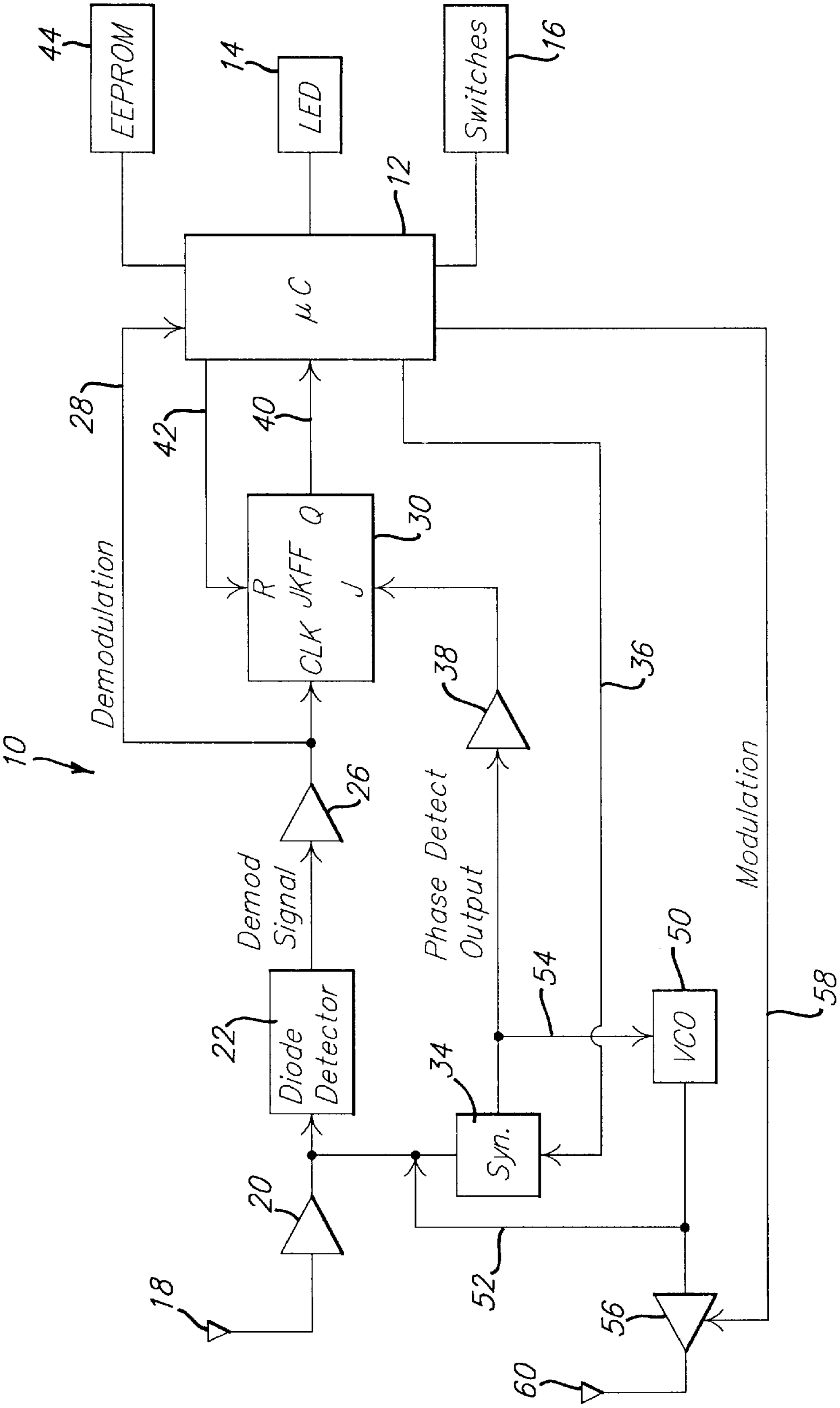
FIG. 1 is a schematic block diagram of a universal garage door opener according to an embodiment of the present invention.

FIG. 1 is a schematic block diagram of a universal garage door opener (UGDO) 10 according to an embodiment of the present invention. The different components of the UGDO 10 would be configured on a single printed circuit board in order to take advantage of printed circuit board technology, and would be located in a suitable housing. The housing generally would be positioned at a location in a vehicle (not shown) that conforms with the layout and aesthetics of the interior of the vehicle, such as in a vehicle visor. Therefore, the UGDO 10 has certain appeal over the conventional garage door opener transmitter. As will be discussed in detail below, the UGDO 10 is responsive to a transmission from a wide variety of different types of commercially available conventional garage door opener transmitters, and includes circuitry suitable to decipher the transmission so that the particular coded modulation and carrier wave information of the transmission can be stored and recreated by the UGDO 10 when desirable. Because there is a wide variety of differently coded transmission signals for the conventional garage door openers, the UGDO 10 must be able to decipher all these transmission signals to be effective.

The UGDO 10 is microprocessor controlled by a microprocessor 12. In one embodiment, the microprocessor 12 is a Motorola MC68HC05C8A 44-pin processor, known to those skilled in the art. One or more light emitting diodes (LED) 14 provide a lighted indication of when the UGDO 10 is activated, whether it is in a receiving mode or a transmitting mode. When the UGDO 10 is in the receiving mode, the microprocessor 12 and the associated circuitry look for a transmission signal from a conventional garage door opener transmitter (not shown) to decipher and store the transmission signal so that it can be recreated for subsequent transmission. The transmission signal will typically be a radio frequency (RF) signal in the 285–400 MHz range for the known commercially available garage door openers. When the UGDO 10 is in a transmission mode, the microprocessor 12 and associated circuitry will transmit an RF signal that includes the carrier wave and modulation of the transmission signal previously deciphered and stored to open or close a garage door. A series of operator switches 16 are connected to the microprocessor 12 to provide a source from which the operator can put the UGDO 10 in the receiving mode to store a coded frequency signal, or in the transmitting mode to activate a garage door after the signal is stored. In one embodiment, there are three operator switches for independently activating three different garage doors.

The receiver portion of the UGDO 10 is a direct digital receiver with no heterodyning. One of the operator switches 16 is held for a predetermined period of time, for example 15 seconds, to put the UGDO 10 in the receiving mode. In the receiving mode, a receiving antenna 18 receives a transmission signal from the conventional garage door opener that is to be recreated. To accomplish this, the conventional garage door opener is positioned proximate to the UGDO 10 and activated such that the transmission signal is aimed at the antenna 18. The antenna 18 can be a printed circuit antenna or a wire antenna mounted to the printed circuit board, depending on the specific application. The transmission signal is a carrier frequency signal modulated in a suitable manner to be coded for each application. The carrier frequency signal is a digital amplitude modulated signal, and thus is not on at all times. The digital amplitude modulation for the Genie brand garage door opener causes the carrier frequency to be on for 20 $\mu$sec.

The carrier frequency signal received by the antenna 18 is applied to an amplifier 20. In one embodiment, the amplifier 20 is an amplifier chain that consists of three mini-circuit VAM-6 monolithic amplifiers, each having 20 dB gain. The coupling between the first and second amplifier stage and the second and third amplifier stage includes a series inductor-capacitor amplifier filter to give a bandpass response to reject unwanted signals and noise.

The amplified carrier frequency signal from the amplifier 20 is applied to an amplitude detector, particularly a diode detector 22, that includes, in one example, a schottky diode for demodulation purposes. The digital amplitude modulation of the amplified carrier frequency signal is demodulated by the detector 22 to strip off the envelope of the carrier frequency signal and remove the carrier wave. The demodulation signal from the detector 22 is typically on the order of 50 mV, and is applied to a comparator 26. The comparator 26 is triggered to high impedance when a predetermined threshold, for example 20 mV, is exceeded. This threshold is set by a resistor divider network (see FIG. 2). The comparator 26 squares-up the demodulation signal so that the output of the comparator 26 is, for example, a 6 volt, square wave amplitude level signal that is logical compatible with the microprocessor 12. The on and off sequence of the 6 volt level demodulation signal is fed to the microprocessor 12 on line 28, where it is stored for future transmission. The 6 volt demodulation signal is also applied to a JK flip flop 30 as a clock signal for reasons that will be discussed below.

The amplified carrier frequency signal from the amplifier 20 is also applied to a frequency synthesizer 34. The operation of the synthesizer 34 is controlled by the microprocessor 12 on a bus 36. In one embodiment, the frequency synthesizer 34 is the HD155001T Built-In Prescaler, Phase-Locked Loop (PLL) Frequency Synthesizer IC available from Hitachi, known to those skilled in the art for use in analog cellular systems. The amplified carrier frequency signal is divided down in the synthesizer 34 by a dual modulus prescaler divider chain. This divider chain is capable of dividing the carrier frequency signal by any integer between 4560 and 6400. The value of a "program" counter and a "swallow" counter in the synthesizer 34 provides a divide ratio that sets the integer value of the dual modulus divider chain, and thus the value at which the carrier frequency signal is divided. For the frequency synthesizer 34, the maximum value of the program counter is 6400 and the maximum value of the swallow counter is 63. As will be discussed below, the swallow counter value provides a fine tuning for the divide ratio. One program count is equal to64 swallow counts. The divided carrier frequency signal is compared to a reference frequency signal available from the microprocessor 12, and can be a 4 MHz microprocessor clock signal that controls the timing of the microprocessor 12. The synthesizer 34 divides the reference frequency signal by 65 to give a divided reference frequency signal of61.5 kHz. Counts of one in the program counter give a frequency resolution of 4 MHz, and counts of one in the swallow give a resolution of61.5 kHz. The frequency set by the dual modulus prescaler divider chain is the divided reference frequency signal multiplied by the division ratio set in the program counter and the swallow counter.

The divided carrier frequency signal is compared to the divided reference frequency signal to determine the frequency of the received carrier frequency signal. If the divided carrier frequency signal is less than the divided reference frequency signal, a phase detect output signal of the synthesizer 34 is low. If the divided carrier frequency signal is greater than the divided reference frequency signal, the phase detect output signal goes high. Initially, the program counter is set to divide the carrier frequency signal by the maximum division of 6400, and the divided carrier frequency signal and the divided reference frequency signal are compared. If the phase detect output signal is low at the maximum division ratio, the program counter is decremented by one count, which sets the division ratio of the carrier frequency signal to 6399. A comparison between the newly divided carrier frequency signal and the divided reference frequency signal is then determined. If the phase detect output signal is still low, the program counter is again decremented by one count, and a comparison between the newly divided carrier frequency signal and the divided reference frequency signal is again determined. This process is repeated until the phase detect output signal goes high as detected by the microprocessor 12.

When the phase detect output signal goes high, the program counter is incremented by one count to cause the phase detect output to go back to low. The divided carrier frequency signal is now known to be within 4 MHz of the divided reference frequency signal. The swallow counter is then decremented by one, and the newly divided carrier frequency signal is again compared to the divided reference frequency signal. If the phase detect output stays low, the swallow counter is again decremented by one. This process is continued until the phase detect output again goes high. When the phase detect output goes high, the carrier frequency signal received by the antenna 18 is known to be within 61.5 kHz of the coded frequency currently existing in the dual modulus prescaler divider chain. Of course, the synthesizer 34 can be programmed and the reference frequency signal can be changed to give other varying degrees of resolution for different applications, if desirable. Because the carrier frequency signal is digitally amplitude modulated, it is not on at all times. Therefore, the phase detect signal output of the frequency synthesizer 34 will only be present when the carrier frequency signal is present, that is when the modulation is in the "on" state. The phase detect output signal sends out a phase pulse every 1/61.5 kHz, or about 16 μsec. The phase detect pulse is high when the divided carrier frequency signal is below the divided reference frequency signal, and is low when the divided carrier frequency is above the reference frequency signal. When the divided carrier frequency signal and the divided reference frequency signal are equal, the phase detect output goes to a high impedance state.

The microprocessor 12 causes the synthesizer 34 to adjust the values in the program counter and the swallow counter. In the implementation being discussed herein, the software in the microprocessor 12 checks for three phase detect high pulses before incrementing the program counter by one count and three phase detect high pulses before decrementing the swallow counter by one count to determine the carrier frequency. There is a suitable delay between when the microprocessor 12 checks for phase detect high pulses. This is for noise immunity purposes.

In the current implementation, the comparison between the divided carrier frequency signal and the divided reference frequency signal is performed at 61.5 kHz for two reasons. The first reason is for achieving the desired frequency resolution. A reference frequency of 500 kHz or less would give the resolution required by the product specification of the currently available conventional garage door openers. The second reason is that there is a hardware limitation of the synthesizer 34. In the dual modulus prescaler divider chain, the program counter value always has to be larger than the swallow counter value. The maximum swallow counter value is 63 counts, the modulus of the prescaler, which makes the minimum program counter value 65 counts. The total division ratio is given by:

(program counter value ×64)+the swallow counter value=total divide ratio

By this formula, the minimum divide ratio is 65×64=4160. The maximum carrier frequency signal is 400 MHz, which when divided by 4160 is 96 kHz. The reference frequency signal as selected by the programmable reference divider in the synthesizer 34 could be 61.5 kHz or 123.1 kHz, which is greater than 96 kHz. Therefore,61.5 kHz was chosen after the reference frequency in this embodiment.

It is possible to decrease the time to record an incoming signal by using a counter interval other than one for the program or swallow counter increment/decrement intervals. For example, a binary search algorithm may be implemented to cause the program and swallow counters to converge must faster.

The microprocessor 12 determines the state of the phase detect output signal of the synthesizer 34 in the following manner. The phase detect output signal of the synthesizer 34 is applied to the non-inverting input of a comparator 38, where it is compared to a 2.5 volt level. The combination of the comparators 26 and 38 can make up a dual comparator, and can be the LM2903, known to those skilled in the art. The output of the comparator 38 is applied to the J input of the flip flop 30 such that the state of the phase detect output of the synthesizer 34 is clocked into the flip flop 30 at the falling edges of the on/off sequence of the demodulation signal from the comparator 26. The state of the phase detect output signal is transferred from the flip flop 30 to the microprocessor 12 on line 40. The flip flop 30 operates to hold the state of the phase detect output signal long enough to allow the microprocessor 12 to determine this signal. In other words, the operation of the synthesizer 34 is such that the phase detect output signal may go from low to high and back to low again when the divided carrier frequency signal is less than the divided reference frequency signal in a way that the microprocessor 12 may not be able to react fast enough to the high signal. Therefore, it is desirable to ensure that the microprocessor 12 does in fact register the high phase detect output signal. The flip flop 30 allows the phase detect output signal to be held for the length of time necessary. The microprocessor 12 can then reset the flip flop 30 for the next time the phase detect output signal goes high by a reset line 42. By clocking in the synthesizer state when modulation is present, the immunity to noise of the system is greatly enhanced.

The microprocessor 12 controls the operation of the synthesizer 34 by applying a signal on the line 36 to instruct the synthesizer 34 when to decrement the program and swallow counters. Therefore, the microprocessor 12 knows the count value in both of these counters, and can store a code indicative of these count values and the reference frequency. Once the microprocessor 12 learns the carrier frequency of the signal received by the antenna 18 in the manner as just described, this frequency is stored at a known address in an EEPROM 44 for subsequent transmission.

Figure 2:
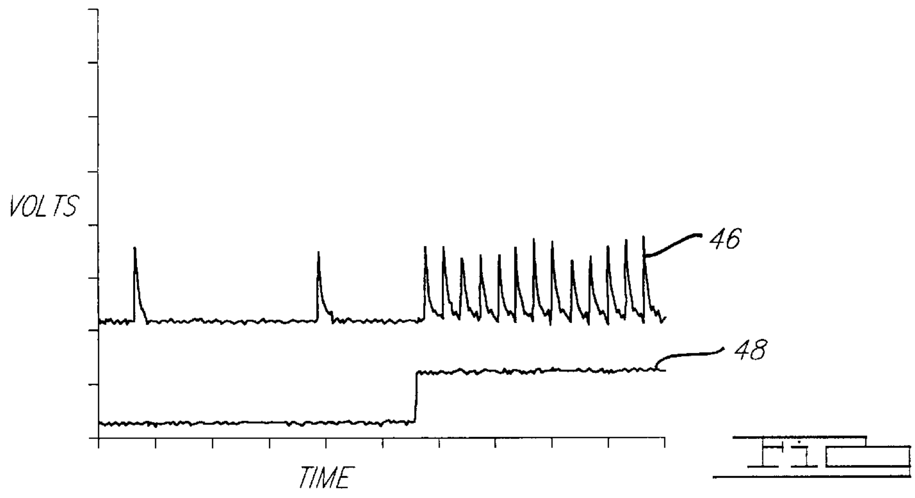
FIGS. 2–4 are graphical diagrams showing voltage on the vertical axis and time on the horizontal axis depicting carrier frequency modulation and phase detect output signals in the universal garage door opener shown in FIG. 1.
Figure 3:
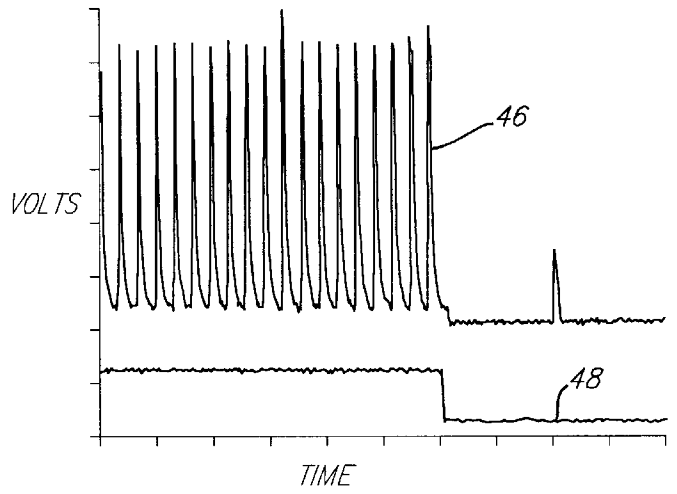

FIG. 2 is a graph of voltage on the vertical axis and time on the horizontal axis that shows a phase detect output signal 46 from the synthesizer 34, and a modulation signal 48. Each vertical interval for the phase detect output signal 46 represents one volt, and each vertical interval for the modulation signal 48 represents 5 volts. Each horizontal increment is 50 μsec. As is apparent, when the carrier frequency signal is off, the phase detect output signal 46 occurs infrequently, at a low voltage value. When the carrier frequency signal is present, and the modulation is on, the phase detect output signal 46 occurs frequently at a low voltage. FIG. 3 depicts the same graph as that in FIG. 2, but in which the phase detect output signal 46 is high and the carrier wave is present so the modulation is on.

If one of the operator switches 16 is activated to cause the UGDO 10 to be put in the transmission mode, the synthesizer 34 is switched on and a variable controlled oscillator (VCO) 50 is activated to generate a carrier frequency for the transmitted signal. The VCO 50 can be tuned within the range of 285 to 400 MHz. In one example, the VCO 50 is an MMBT5179 transistor in a colpitts oscillator configuration. Tuning is accomplished with a Hitachi varactor diode (HVU 350) from the collector to ground.

The values of the program and swallow counter previously stored in the EEPROM 44 are sent to the synthesizer 34 on line 36 by the computer 12 to set the program and swallow counters to the appropriate values that sets the division ratio of the dual modulus prescaler divider chain for the appropriate carrier frequency. A carrier frequency output of the VCO 50 is applied to the synthesizer 34 on line 52, and is divided down by the division ratio in the program counter and the swallow counter. The divided VCO carrier frequency signal is then compared to the divided reference frequency signal, in the manner as discussed above. The phase detect output signal applied to the VCO 50 on line 54 is a series of pulses where the pulse width of the pulse repetition rate is indicative of the difference between the divided VCO carrier frequency signal and the divided reference frequency signal. If the divided VCO carrier frequency signal is greater than the divided reference frequency signal, then the pulses are a pulse low minus zero volts. If the divided VCO carrier frequency signal is greater than the divided reference frequency signal, then the pulses are positive. These pulses and pulse widths are used to control the tuning of the VCO 50 to match the stored carrier frequency transmission signal. The phase detect output signal applied to the VCO 50 is low pass filtered (see FIG. 5(C)) to provide an averaging function. The phase detect output signal, when low pass filtered, produces a voltage proportional to the difference of the two divided down frequencies. This voltage is used to drive the VCO 50 to the frequency which is the synthesizer divider ratio times the divided reference frequency signal.

The carrier frequency output signal of the VCO 50 is applied to a transmit amplifier 56 to drive the amplifier 56, and isolate the VCO 50 from frequency pulling. The transmission amplifier 56 is turned on and off by a digital modulation signal from the microprocessor 12 on line 58 to modulate the carrier frequency signal in accordance with the stored demodulation data. The frequency pulling is caused by turning the amplifier 56 on and off. In one embodiment, the transmit amplifier 56 includes two series L-C filters, one on the input and the other on the output. These filters are used to both limit the harmonic content of the transmitted signal, and to adjust the frequency response of the transmission. The frequency response is set so that maximum power can be transmitted at all frequencies between 285 to 400 MHz, without exceeding the FCC requirements. The output of the amplifier 56 is applied to a transmission antenna 60, which can be a printed circuit antenna along the perimeter of the UGDO board. The antenna 60 is optimized for signal strength, radiation pattern, use in multiple configurations and low harmonic emissions.

Figure 4:
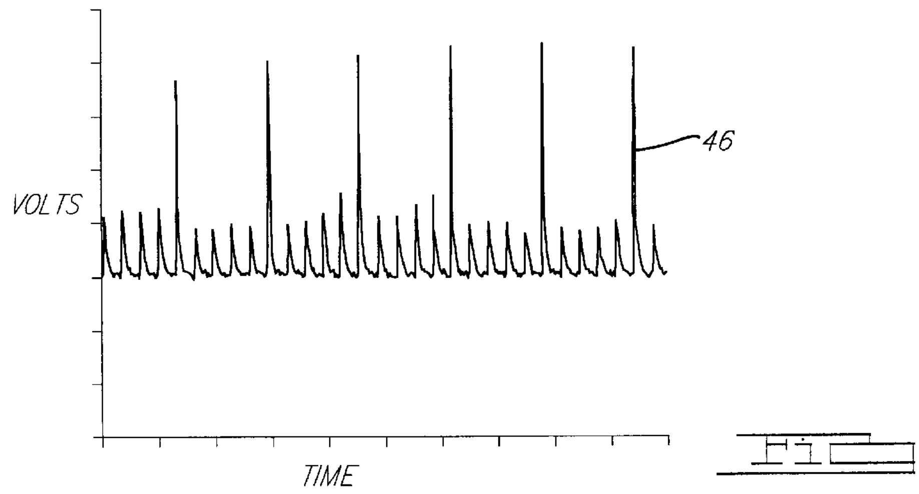

FIG. 4 shows a plot of the phase detect output signal 46 when the UGDO 10 is in the transmission mode, where the pulses of the output signal 46 are used to adjust the tuning voltage of the VCO 50.

Figure 5A:
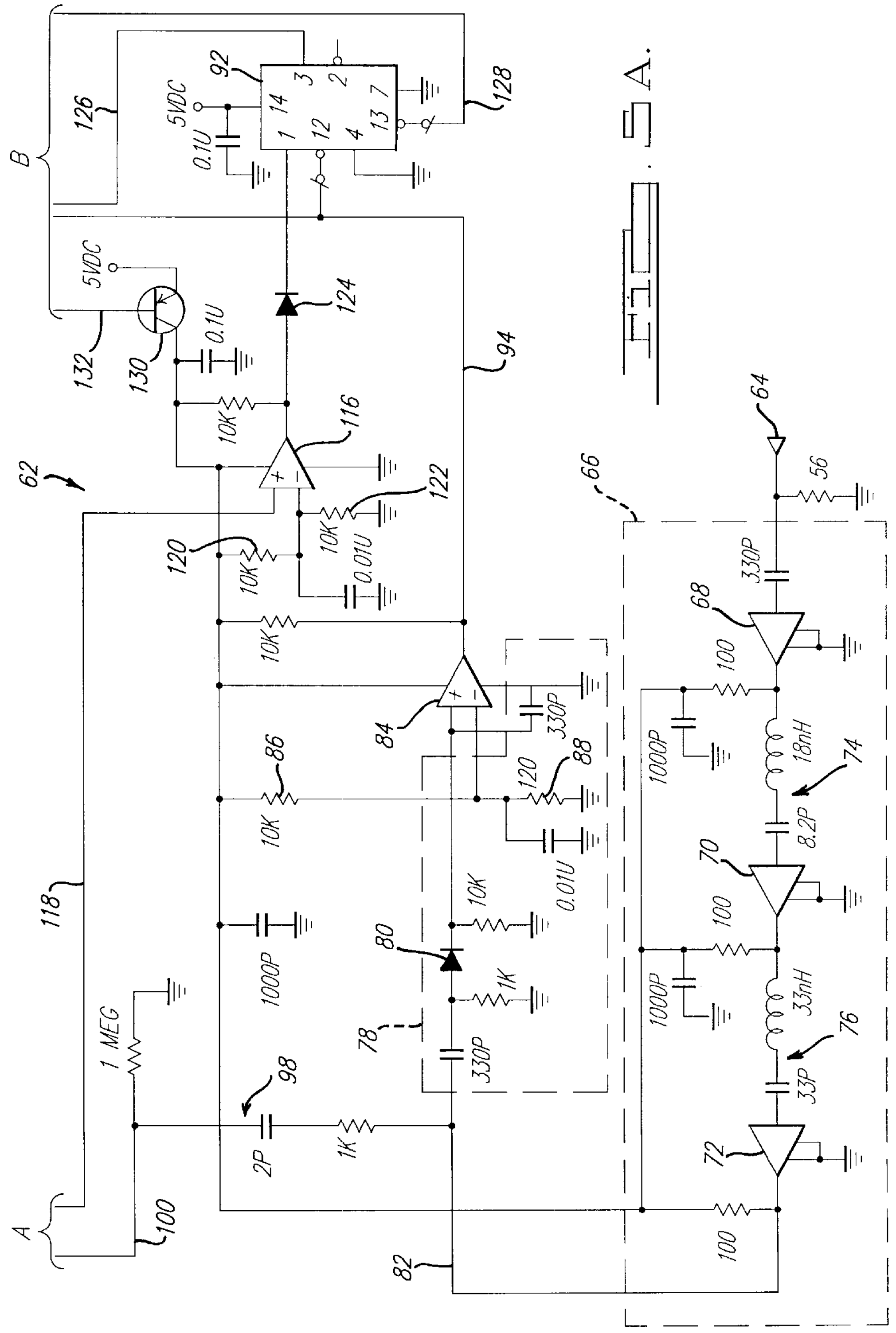
FIGS. 5(A)–5(C) is a schematic diagram of the universal garage door opener shown in FIG. 1.
Figure 3B:
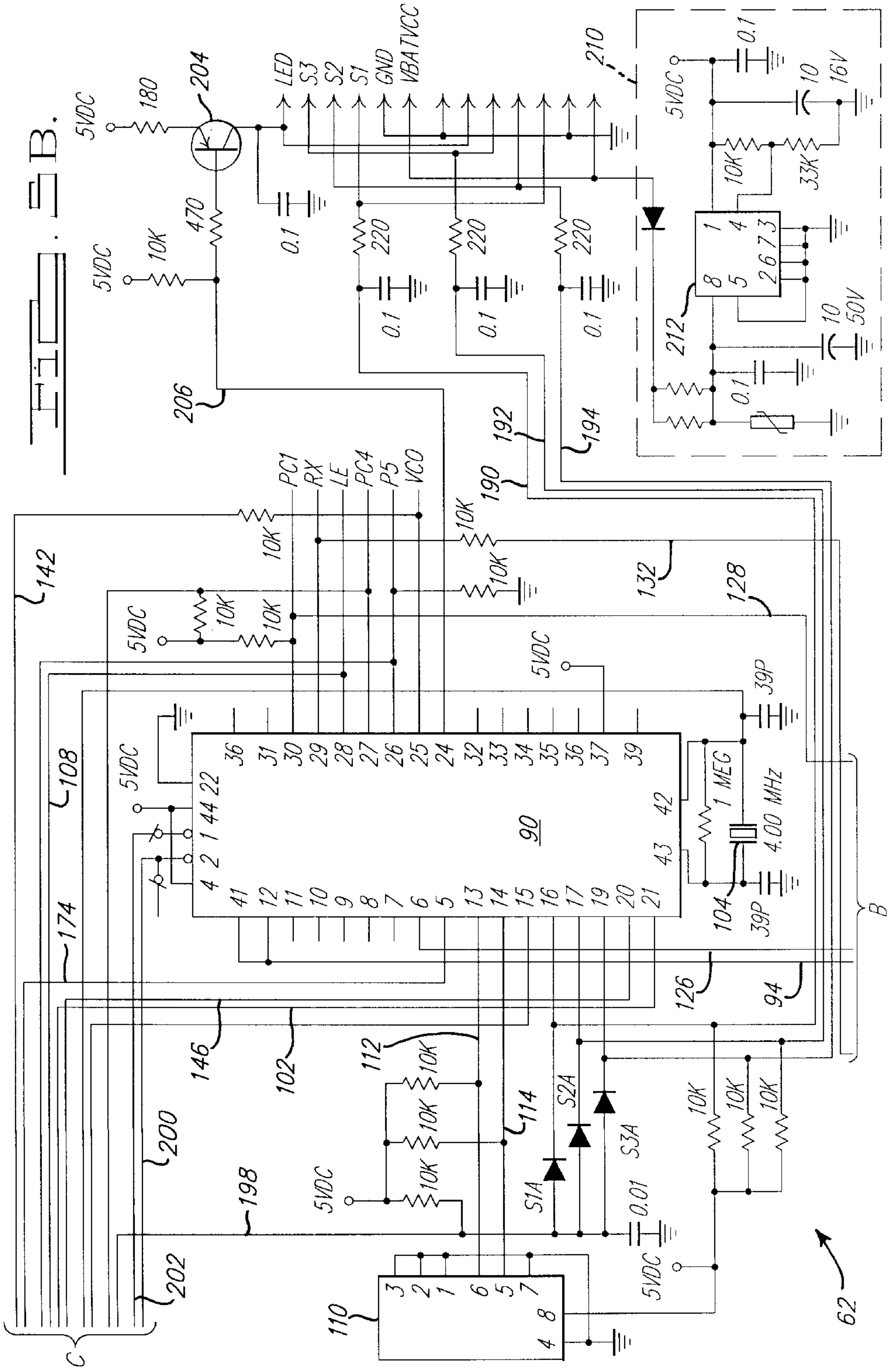
Figure 5:
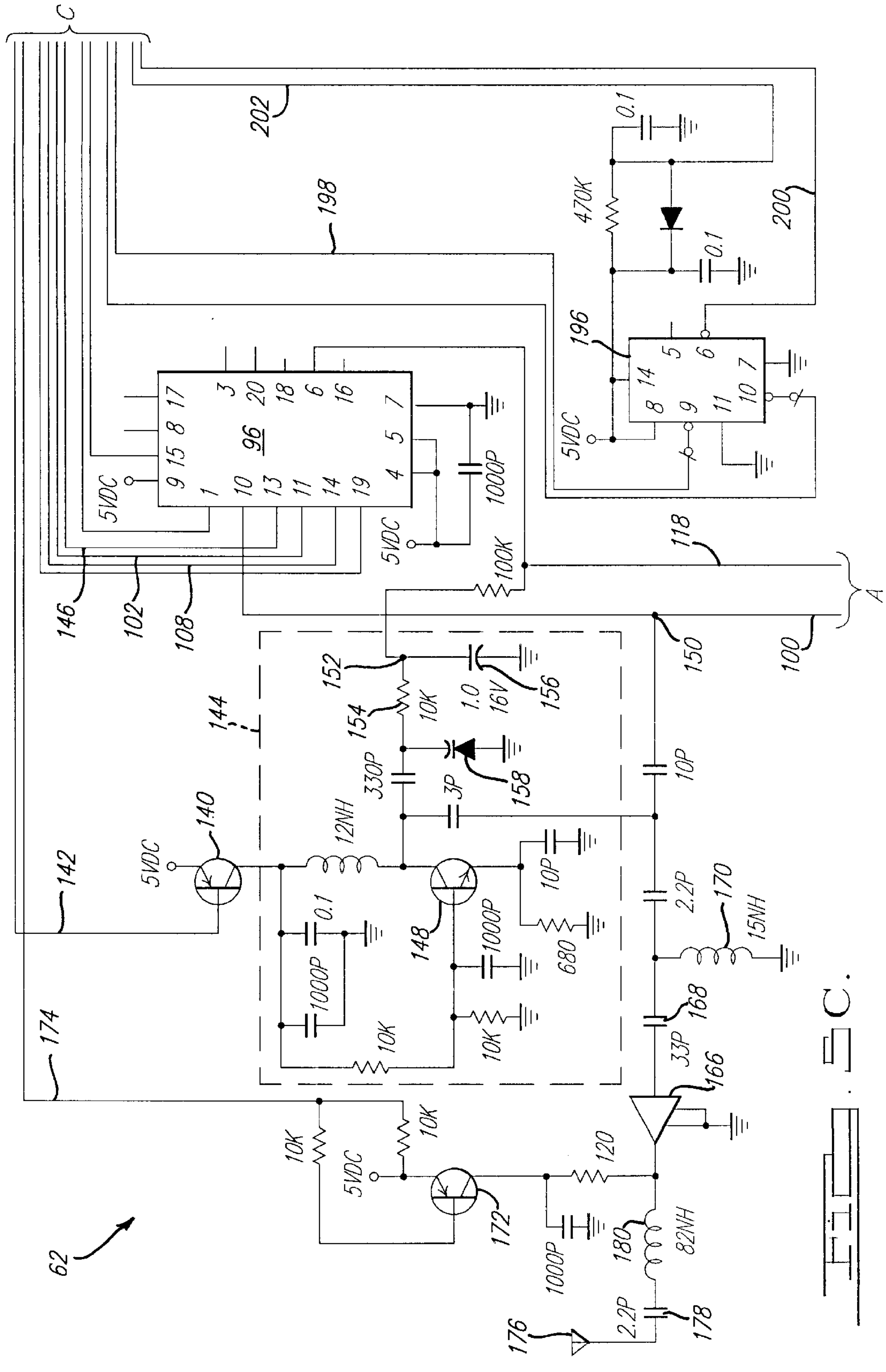

FIGS. 5(A)–5(C) show a detailed schematic diagram 62 of the UGDO 10. All the shown resistance values are in ohms, the capacitance values are in farads, and the inductance values are in henries. A receiver antenna 64, representing the antenna 18, receives the transmitted carrier frequency signal. The received carrier frequency signal is amplified and filtered by an amplifier chain 66, representing the amplifier 20. The amplifier chain 68 includes first, second and third mini-circuit VAM-6 monolithic amplifiers 68, 70 and 72, respectively, each having 20 db gain. A series inductor-capacitor filter 74 couples the first amplifier 68 and the second amplifier 70, and a series inductor-capacitor filter 76 couples the second amplifier 70 and the third amplifier 72. The amplified carrier frequency signal from the amplifier chain 66 is then applied to an amplitude detector 78, including a schottky diode 80, on line 82. The digital amplitude modulation of the carrier frequency signal is demodulated by the amplitude detector 78 to remove the carrier wave and strip off the envelope of the carrier frequency signal, in a manner that is well understood in the art. The resulting demodulated signal, without the carrier wave, is applied to the non-inverting terminal of a comparator 84, representing the comparator 26 above. The comparator 84 triggers when a predetermined threshold value, applied to the inverting terminal of the comparator 84, is exceeded. This threshold value is set by a resistor divider network consisting of resistors 86 and 88. A square wave amplitude level demodulation signal from the comparator 84 is fed to input pins 12 and 41 of a microprocessor 90 and a clock input at pin 12 of a J-K flip flop 92 on line 94. This demodulation signal provides the modulation data that is stored and later used to modulate a recreated carrier frequency signal.

The output on line 82 from the amplifier chain 66 is also applied to a frequency synthesizer 96 at pin 10, representing the synthesizer 34 above, through an attenuation circuit 98 on line 100. As discussed above, the frequency synthesizer 96 divides down the carrier frequency signal using a dual modulus prescaler divider chain within the synthesizer 96. This divided carrier frequency signal is compared to a divided reference frequency signal applied to the synthesizer 96 at pin 11 from pin 21 of the microprocessor 90, on line 102. This reference frequency is generated from a 4 MHz microprocessor clock, particularly by a crystal 104. The crystal 104 also provides a clock signal to the synthesizer 96 on line 106 to control the synthesizer 96. The microprocessor 90 instructs the synthesizer 96 to increment and decrement the program counter and the swallow counter when the divided carrier frequency signal is being compared to the divided reference frequency signal by an instruction signal applied on line 108 from pin 28 of the microprocessor 90 to pin 14 of the synthesizer 96. When the divided carrier frequency signal is within the resolution of the divided reference frequency signal, the frequency synthesizer 96 operates as discussed above to generate a carrier frequency code of the received carrier frequency signal as counts in the program counter and the swallow counter with a resolution of 1.5 kHz. The carrier frequency code is stored in an EEPROM 110 on line 112 from pin 13 of the microprocessor

90, and is retrieved from the EEPROM 110 on line 114 at pin 14 of the microprocessor 90 when desired.

A phase detect output signal from the frequency synthesizer 96 is applied to the non-inverting terminal of a comparator 116, representing the comparator 38, above, on line 118. A suitable threshold level is applied to the inverting terminal of the comparator 116 by a resistor divider network consisting of resistors 120 and 122. When the phase detect output signal of the synthesizer 96 goes high, and the threshold level at the inverting terminal is exceeded, an output of the comparator 116 goes to high impedance. This output is applied to the J terminal at pin 1 of the flip flop 92 through a diode 124. The diode 124 stretches the pulse from the comparator 116 so as to insure that the state of the phase detect output signal appears at the J terminal of the flip flop 92 on the falling edge of the modulation. The flip flop 92 does not change its output state on the next clock pulse when the high signal applied to the J terminal goes low because the K input at pin 4 of the flip flop 92 is tied to ground. When the phase detect output signal of the synthesizer 96 goes high, it is applied to the microprocessor 90 at pin 6 on line 126, as held by the flip flop 92, in the manner as described above. A reset signal is applied to the flip flop 92 on line 128 from pin 30 of the microprocessor 90 when the microprocessor 90 reads the high level on line 126, so as to be ready for the next time the phase detect output signal of the synthesizer 96 goes high.

If one of the operational switches 16 of the UGDO 10 is activated to put the UGDO 10 in the receive mode, the microprocessor 90 outputs a signal at pin 29 to the base terminal of a PNP switching transistor 130 on line 132. This provides the 5 VDC power to the receive mode components discussed above. This allows the receiver circuitry to be switched off when the UGDO 10 is in standby or not in use. Thus, power consumption can be saved.

When one of the operational switches 16 is activated to put the UGDO 10 in the transmission mode, a signal from the microprocessor 90 at pin 25 is applied to the base terminal of a PNP switching transistor 140 on line 142 to switch a 5 VDC power signal to a variable VCO 144. The transistor 140 allows the transmitter circuitry to be turned off when not in use to save power. Additionally, the program counter and swallow counter values stored in the EEPROM 110 are applied to the frequency synthesizer 96 at pin 13 on line 146 to set these values in the program counter and swallow counter in the synthesizer 96. When the VCO 144 is activated, an oscillator transistor 148 in the VCO 144 is switched on, and a colpitts oscillator configuration of the VCO 144 generates a carrier frequency output signal at node 150. This carrier frequency signal is applied to the synthesizer 96 on line 100, and is divided by the dual modulus prescaler divider chain, as set by the microprocessor 90. The divided VCO carrier frequency signal is then compared to the divided reference frequency signal, and an output is generated on the phase detect output line 118. The phase detect output signal is applied to the VCO 144 at node 152, and is filtered by an RC circuit consisting of a resistor 154 and a capacitor 156 so as to average the pulses in the phase detect output signal and get a corresponding DC voltage value. This DC voltage value is applied to a varactor diode 158, to adjust the center oscillation frequency of the VCO 144. The new carrier frequency signal of the VCO 144 is applied to the synthesizer 96 on line 100, where the new frequency signal is again divided and compared to the divided reference frequency signal to further adjust the center frequency of the VCO 144. This process generates a carrier frequency signal substantially the same as the received carrier frequency signal when the UGDO 10 was in the receive mode. Although the combination of the frequency synthesizer 96 and the VCO 144 acts substantially like a phase locked loop, the combination of these two components never actually lock onto a particular frequency, and therefore combine to be more of a frequency tracking system.

The output of the VCO 144 is also applied to a transmit amplifier 166 through a fixed filter circuit consisting of a capacitor 168 and a coil 170. The modulation necessary to recreate the received transmission signal that is stored in the EEPROM 110 modulates the amplified carrier frequency signal from the VCO 144 at the output of the amplifier 166. To perform this task, the microprocessor 90 switches a PNP transistor 172 on and off in accordance with the stored demodulation data by applying a signal on line 174 to the base terminal of the transistor 172. By timing the switching of the transistor 172, the carrier frequency signal is modulated in accordance with the demodulation signal stored during the receive mode. The modulated carrier frequency signal is then applied to a transmitting antenna 176 through a fixed filter circuit including capacitor 178 and a coil 180. The transmitting antenna 176 is a printed electric field antenna, tuned for frequency and spatial response.

For the UGDO 10 discussed above, there are three operational switches 16 that can independently control three garage doors. By independently actuating each of the different switches, and holding the switches 16 for a predetermined period of time, the UGDO 10 will be put in the receive mode. By activating any of the switches 16 independently, the UGDO 10 is put in the transmission mode. The operator switches 16 independently put a high signal at pins 16,17 and 19 of the microprocessor 90 on lines 190, 192 and 194, respectively, at inputs S1–S3. When a switch 16 is activated, the high signal is also applied to a clock input signal of a JK flip flop 196 at pin 9 on line 198 through the corresponding diode S1A–S3A. When the clock input of the flip flop 196 is activated, the JK flip flop 196 outputs a signal on line 200 that will cause the microprocessor to scan the input pins 16, 17 and 19 to determine which of the switches 16 has been activated. This allows the microprocessor 90 to only scan the pins 16, 17 and 19 when it knows one of the switches 16 is activated. The J input is connected to a 5 VDC signal at pin 8 and the K input is connected to ground at pin 11. A reset signal from pin 1 of the microprocessor 90 is applied to pin 14 of the flip flop 196 on line 202.

Additionally, the microprocessor 90 activates the LED 14 when one of the switches 16 is activated. When the switch 16 is activated, the microprocessor 90 applies a signal to the base terminal of an LED switching transistor 204 on line 206, which in turn switches on the LED 14. In the transmit mode, the LED 14 will remain on. In the receive mode, the LED 14 will continuously flash at a ½ Hz rate.

A voltage regulator circuit 210 including a voltage regulator 212 provides power to the UGDO 10. The voltage regulator circuit 210 receives a 13.6 battery voltage from the vehicle battery (not shown) at the VBATVCC input, and provides the VDC power necessary to drive the UGDO 10.

The microprocessor 90 is programmed to perform the functions as discussed above. In the receive mode, the UGDO 10 observes the incoming transmission signals from the conventional garage door opener transmitter for 400 msec, and determines the shortest pulse width within that time. The shortest pulse width is measured as the time elapsed by a counter in the microprocessor 90 from one waveform transition to a next waveform transition. Both positive going pulse widths and negative going pulse widths are measured. The 400 msec time frame was empirically determined to be a good dwell time to capture the minimum pulse widths of the commercially available Stanley, Genie and Chamberlain garage door opener transmitters. The internal timer of the UGDO 10 has a 2.0 μsec resolution at the 4 MHz nominal microprocessor operating frequency.

If the minimum pulse width of the received transmission signal is less than or equal to 29 timer counts (58 μsec or half of 8.6 kHz), the received transmission signal is decoded as a Genie brand modulation. If the minimum pulse width is greater than 29 timer counts, the transmission signal is decoded as an "unknown" modulation. The minimum pulse width is translated into "delay" units. The delay unit is a value for a loop counter, and one delay bit is 2.5 μsec. The delay unit value is range checked to see if it is too large or small, and set to defaults accordingly if so.

The process for decoding the unknown transmission signal is general purpose in utility. The UGDO 10 is set to sample at half the measured minimum pulse width, effectively four times the incoming frequency. An internal bit timing resolution is set to 2.5 μsec. The maximum ½ minimum pulse width time is 644.5 μsec. Longer pulse widths may be presented to the UGDO 10, but could distort because the error may exceed ½ minimum pulse width timing. This would start to occur at modulation frequencies lower than 388 Hz. The total maximum modulation pulse width error for a non-Genie waveform is ½ the minimum pulse width.

The algorithm for the unknown decoding process is therefore a dynamic resolution process in which the system resolution is calculated based upon the minimum pulse width of the transmission signal to be sampled. The software selects the sampling frequency so that the UGDO's internal sample rate is slightly faster than ½ the minimum pulse width. This means that pulses will be stretched, not shrunk, should the two sample rates differ enough. This has some advantage in post process error correction.

Because the minimum pulse width is represented by two samples in memory, this is referred to as a basis function. The subsequent modulation pulse widths are stored in the microprocessor memory using the basis function. In other words, all subsequent pulse widths of the modulation are an even integer multiple of the basis function, and the incoming modulation is remapped to the time base of the UGDO 10.

In post-sampling analysis, if an odd number of samples for a particular pulse width is present, then there is a pulse stretch and the pulse stretched interval is corrected. It should be noted that in long stretches of a particular pulse width, there may be more than one pulse width stretched, and if an even number of pulses are stretched, this method will not detect it. However, correction can be made by obtaining the beat interval from a previous pulse width correction for short pulse widths, then calculating the number of pulses which would be stretched. In fact, the beat interval can be used to predict where all the pulse stretches occur if both time basis, internal and external to the UGDO 10, are stable. In practical use, however, the long pulse widths occur between data frames so it is not necessary to correct these pulse widths.

By oversampling, any pulse distortion is always stretched in time. The pulse width stretches are spaced apart to be proportional to the beat frequency between the PLL frequency of the UGDO 10 and the incoming signal. The closer the frequencies get to each other, the lower the beat frequency and the farther apart the pulse stretches occur in the modulation record. By using the basis function discussed above, any odd number of consecutive high or low instances is a pulse stretch. By removing a pulse stretch, the modulation is corrected and is mapped to the UGDO's time base. By using the even/odd basis function strategy, the UGDO 10 can parse the modulation very quickly with no intensive mathematical calculations. This reduces the memory and calculation requirements for the microcontroller and therefore lowers the system cost.

The UGDO 10 tries to find a sync pattern in the unknown transmission signal style waveform. If it can find three of the longest stream of zeros that are of the same length within a predetermined tolerance, the carrier frequency is aligned and truncated so that the frames start on a boundary, and the wraparound time can be stretched to accommodate UGDO housekeeping chores, like LED flashing, key monitoring and the like. If the UGDO cannot find a sync pattern, it leaves the transmission signal alone, but still accepts it as good. This accommodates other unknown types of garage door openers, such as a continuous 7 kHz square waveform. In the case of the Stanley style modulation, approximately six data frames are recorded and stored so multiple frames schemes will also be recorded.

The algorithm for the Genie brand transmission sets up a known time interval counter, and increments counts until the modulation changes state. If the count is above a threshold, the microprocessor 90 assumes that the signal is in the slow modulation portion of a Genie brand signal, otherwise it is in a fast portion of the signal. The incoming Genie transmission signal is encoded in this fashion resulting in up to six frames of Genie data stored in the microprocessor 90. The Genie transmission signal is then post-processed by aligning it to a Genie frame sync boundary, adjusting the fast and slow modulation encoding to be equal in time, then decrypting the entire frame into two bytes, essentially a 1:1 representation of the switches on the Genie GDO transmitter. The decryption process incorporates noise reduction also. The switch codes are re-expanded into 1024 bits of RAM in the microprocessor 90, and stored in the EEPROM 110. This allows the transition signals to be able to played back by the same generic playback algorithm as they are stored in the same data structure and format. There is no distortion with the Genie algorithm, but the signal is remapped to the internal UGDO time base. The fastest Genie signal the UGDO 10 can process is over 25 kHz, and the slowest is about 15.38 kHz. The cut off was empirically determined by adjusting the Genie transmitter until the corresponding receiver would not operate, then adding margin. There is a provision for resampling the waveform if the incoming frequency is out of range.

The UGDO 10 stores one Genie frame, however, during parsing of the waveform up to six frames are analyzed. There are no partial frames retransmitted in that the frame is complete and there is no distortion in the waveform.

The two Genie modulation frequencies can vary greatly and are always in a 2:1 ratio due to the nature of the design of the Genie garage door opener. All pulse widths are derived from a single clock source and therefore must be a multiple of that source. The UGDO 10 can match a wide range of tolerances. The Genie garage door opener modulation frequencies are derived from a ramp generator using an R-C time constant. The capacitor of the R-C circuit is not a low tolerance type, so variance from unit to unit is expected. The ramp may vary with battery voltage so there is some drift within a unit.

The Genie modulation is effectively 1024 bits long which maps to 128 bytes. The "fast" portion of the Genie signal consists of 16 cycles of fast modulation always starting low, i.e., the carrier is off. The "slow" portion consists of 8 cycles of modulation, exactly twice the period of the fast modulation. The Genie garage door opener uses many sections to generate the timing pulse widths. The UGDO 10 is designed to accommodate 15.38 kHz–25 kHz for the fast portion of the modulation on a nominal 4 MHz system.

The sync pattern is the only place in the modulation where two slow-slow intervals appear consecutively. When a switch is in the "slow" state, the respective position in the modulation is a fast-slow sequence. When a switch is in the "fast" position, the respective position in modulation is a fast-fast sequence. The nominal modulation rate is about 20 kHz, so the minimum modulation pulse width is 25 μsec. The modulation takes 1024 bits to play the entire frame once, but may take as long as 33.3 msec if the Genie modulation is very slow.

The Genie modulation consists of a sync section of FFSSFFFS where F indicates 16 cycles of fast modulation and S indicates 8 cycles of slow modulation. This is followed by the switch data section which consists of 12 intervals of either FF or FS depending on the position of the switch. Thus, a complete modulation pattern might be FFSSFFFSFSFSFSFSFSFSFSFSFSFSFSFS if all 12 switches are in the "slow" position.

The recording of digital modulation in bases functions and delay units using the algorithms discussed above, and the UGDO 10 as described comprise a unique, simple method of remapping and incoming digital modulation to the internal UGDO time base without distortion. This prevents having to have a unique recording method for each of the commercially available garage door opener signals.

The UGDO 10 uses the frequency synthesizer 34 with the flip flop 30 and pulse stretcher diode 124 to actually measure the incoming carrier wave without using heterodyning techniques. Other known universal garage door openers must use heterodyning techniques which lead to image frequency errors, poor resolution, and additional difficulty in complying with FCC specifications. Thus, the UGDO 10 has advantages over existing designs by using fewer components, obtaining finer resolution, and being of a simpler design to comply with FCC specifications.

The UGDO 10 described above has other advantages over the currently available universal garage door openers. For example, the UGDO 10 does not include any local oscillators which may emit interfering or spurious signals during the receive mode. The transmitted frequency signal is synthesized for greater accuracy, and the transmit output power is controlled by a tuning network, and not an attenuator. Additionally, the receiver portion is capable of receiving 10 MHz to 1.1 GHz. Also, the entire UGDO 10 can be configured on one side of a single circuit board, including the receiver and transmitter circuitry.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A universal garage door opener (10) comprising:

a receiver antenna (18,64) responsive to a modulated carrier frequency signal;

a detector (22,78) responsive to the modulated carrier frequency signal from the receiver antenna (18,64), said detector (22,78) demodulating the carrier frequency signal and providing a demodulation signal indicative of the modulation of the carrier frequency signal;

a frequency synthesizer (34,96) responsive to the modulated carrier frequency signal from the receiver antenna (18,64), said frequency synthesizer (34,96) selectively providing a known reference frequency signal, said frequency synthesizer (34,96) dividing the carrier frequency signal by a known value to generate a divided carrier frequency signal and comparing the divided carrier frequency signal to the reference frequency signal to determine the frequency of the carrier frequency signal, said frequency synthesizer (34,96) providing a phase detect output signal indicative of the comparison between the divided carrier frequency signal and the reference frequency signal; and a control device (12,90) responsive to the demodulation signal from the detector (22,78) and the phase detect output signal from the frequency synthesizer (34,96), said control device (12,90) controlling the operation of the frequency synthesizer (34,96) for selectively changing the known value from a maximum divide ratio to a lesser divide ratio until the divided carrier frequency signal is within a predetermined resolution range of the divided reference frequency signal.

2. The universal garage door opener according to claim 1 wherein the frequency synthesizer includes means for establishing a divide ratio and means for dividing the carrier frequency signal, said means for dividing using the divide ratio to divide the carrier frequency signal.

3. The universal garage door opener according to claim 2 wherein the means for dividing the carrier frequency signal is a dual modulus prescaler divider chain.

4. The universal garage door opener (10) according to claim 3 wherein the means for establishing a divide ratio includes a first counter holding a first count value and a second counter holding a second count value, said means for dividing the carrier frequency signal dividing by the first count value at one time, varying the prescaler to a new divisor, and dividing the carrier frequency signal by the second count value at another time, wherein the first count value divides the carrier frequency by more than the second count value.

5. The universal garage door opener according to claim 1 further comprising a flip flop device, said flip flop device being responsive to the demodulation signal from the detector as a clock signal and the phase detect output signal from the frequency synthesizer, said flip flop device holding the output signal from the synthesizer over consecutive clock pulses in the clock signal and applying the phase detect output signal from the synthesizer to the control device.

6. The universal garage door opener according to claim 1 wherein the phase detect output signal from the frequency synthesizer is applied to a comparator so as to compare the phase detect output signal to a known threshold value.

7. The universal garage door opener according to claim 1 further comprising a receiver amplifier, said receiver amplifier being an amplifier chain including first, second and third amplifier stages, wherein a first series inductor-capacitor amplifier filter couples the first amplifier stage to the second amplifier stage, and a second series inductor-capacitor amplifier filter couples the second stage to the third amplifier stage.

8. The universal garage door opener according to claim 1 further comprising a pulse stretcher diode, said pulse stretcher diode being responsive to the phase detect output signal, said stretcher diode stretching pulses in the phase detect output signal to provide enhanced detection capabilities.

9. The universal garage door opener according to claim 1 further comprising a comparator, said comparator being responsive to the demodulation signal from the detector, said comparator providing a square wave amplitude level signal indicative of the modulation of the carrier frequency signal that is logically compatible with the control device.

10. The universal garage door opener according to claim 1 further comprising a receiver switch, said control device switching the receiver switch between an on state and an off state so as to provide power to receiver components when the universal garage door opener is in a receive mode and switch off power to the receiver components when the universal garage door opener is not in the receive mode so as to reduce power consumption.

11. The universal garage door opener according to claim 1 further comprising a variable controlled oscillator, said variable controlled oscillator generating an oscillator carrier frequency signal at a particular tuned center frequency, said frequency synthesizer being responsive to the oscillator carrier frequency signal.

12. The universal garage door opener according to claim 11 wherein the frequency synthesizer is responsive to a divide value from the control device, said frequency synthesizer dividing the oscillator carrier frequency signal by the divide value to generate a divided oscillator carrier frequency signal, said frequency synthesizer comparing the divided oscillator carrier frequency signal to the reference frequency signal, said phase detect output signal being indicative of a difference between the divided oscillator carrier frequency signal and the reference frequency signal.

13. The universal garage door opener according to claim 11 wherein the phase detect output signal is applied to a filtering circuit in the variable controlled oscillator so as to adjust the center frequency of the oscillator carrier frequency signal.

14. The universal garage door opener according to claim 11 further comprising a transmitter amplifier, said transmitter amplifier being responsive to the oscillator carrier frequency signal from the variable controlled oscillator and a modulation signal from the control device indicative of the demodulation signal, said transmitter amplifier modulating the oscillator carrier frequency signal so as to recreate the modulated carrier frequency signal.

15. The universal garage door opener (10) according to claim 14 further comprising a fixed tuned filter circuit (178, 180), said fixed tuned filter circuit (178, 180) being responsive to the recreated modulated carrier frequency signal from the transmitter amplifier (56, 166) so as to generate the maximum allowable radiated power of the modulated carrier frequency output signal without additional attenuation circuitry.

16. The universal garage door opener (10) according to claim 11 further comprising a transmitter antenna (60, 176), said transmitter antenna (60, 160) being a printed circuit board electromagnetic field antenna that is tuned for frequency and spatial response.

17. The universal garage door opener according to claim 1 further comprising a transmitter switch, said control device switching the transmitter switch between an on state and an off state so as to switch power on to transmitter components when the universal garage door opener is in a transmit mode, and to switch power off to the transmitter components when the universal garage door opener is not in the transmit mode so as to reduce power consumption.

18. The universal garage door opener according to claim 1 further comprising a plurality of input switch diodes, where an input signal applied to one of the input switch diodes causes the control device to scan input terminals connected to the input switches so as to determine which switch has been activated.

19. The universal garage door opener (10) according to claim 1 wherein all of the circuit components of the universal garage door opener (10) are configured on one side of a single printed circuit board.

20. The universal garage door opener according to claim 1 wherein the control device is a microprocessor and wherein the demodulation signal from the detector is remapped to a time base of the microprocessor.

21. A universal garage door opener (10) comprising:

a receiver antenna (18,64) responsive to a modulated carrier frequency signal;

means for separating the modulated carrier frequency signal into a first path and a second path;

a detector (22,78) responsive to the modulated carrier frequency signal from the receiver antenna (18,64) along the first path, said detector (22,78) demodulating the carrier frequency signal and providing a modulation signal indicative of the modulation of the carrier frequency signal;

a frequency synthesizer (34,96) including a dual modulus prescaler divider chain and being responsive to the modulated carrier frequency signal from the receiver antenna (18,64) along the second path, said frequency synthesizer (34,96) providing a phase detect output signal indicative of the frequency of the carrier frequency signal; and a control device (12,90) responsive to the demodulation signal from the detector (22,78) and the output signal from the frequency synthesizer (34,96), said control device (12,90) controlling the operation of the frequency synthesizer (34,96) for dividing down the modulated carrier frequency signal by the divider chain until the divided carrier signal is within a predetermined resolution range of a divided reference frequency signal from the divider chain.

22. The universal garage door opener (10) according to claim 21 wherein the frequency synthesizer (34, 96) includes a dual modulus prescaler divider chain and a means for providing a known reference frequency signal, said dual modulus prescaler divider chain dividing the carrier frequency signal by a known value to generate a divided carrier frequency signal and comparing the divided carrier frequency signal to the reference frequency signal to determine the frequency of the carrier signal, wherein the phase detect output signal is indicative of the comparison between the divided carrier frequency signal and the reference frequency signal.

23. The universal garage door opener according to claim 21 further comprising a flip flop device, said flip flop device being responsive to the demodulation signal from the detector as a clock signal and the output signal from the frequency synthesizer, said flip flop device holding the output signal from the synthesizer over consecutive clock pulses in the clock signal and applying the output signal from the synthesizer to the control device.

24. The universal garage door opener according to claim 21 further comprising a pulse stretcher diode, said pulse stretcher diode being responsive to the output signal from the synthesizer, said stretcher diode stretching pulses in the output signal to provide enhanced detection capabilities.

25. The universal garage door opener according to claim 21 further comprising a receiver switch, said control device switching the receiver switch between an on state and an off state so as to provide power to receiver components when the universal garage door opener is in a receive mode and switch off power to the receiver components when the universal garage door opener is not in the receive mode so as to reduce power consumption.

26. The universal garage door opener according to claim 21 further comprising a variable controlled oscillator, said variable controlled oscillator generating an oscillator carrier frequency signal at a particular tuned center frequency, said frequency synthesizer being responsive to the oscillator carrier frequency signal, said universal garage door opener further comprising a transmitter amplifier, said transmitter amplifier being responsive to the oscillator carrier frequency signal from the variable controlled oscillator and a modulation signal from the control device indicative of the demodulation signal, said transmitter amplifier modulating the oscillator carrier frequency signal so as to recreate the modulated carrier frequency signal.

27. The universal garage door opener (10) according to claim 26 further comprising a fixed tuned filter circuit (178, 180), said fixed tuned filter circuit (178, 180) being responsive to the recreated modulated carrier frequency signal from the transmitter amplifier (56, 166) so as to generate the maximum allowable radiated power of the modulated carrier frequency output signal without additional attenuation circuitry.

28. The universal garage door opener (10) according to claim 26 further comprising a transmitter antenna (60, 176), said transmitter antenna (60, 176) being a printed circuit board electromagnetic field antenna that is tuned for frequency and spatial response.

29. The universal garage door opener according to claim 26 further comprising a transmitter switch, said control device switching the transmitter switch between an on state and an off state so as to switch power on to transmitter components when the universal garage door opener is in a transmit mode, and to switch power off to the transmitter components when the universal garage door opener is not in the transmit mode so as to reduce power consumption.

30. The universal garage door opener (10) according to claim 21 wherein all of the circuit components of the universal garage door opener (10) are configured on one side of a single printed circuit board.

31. The universal garage door opener according to claim 21 further comprising a plurality of input switch diodes, where an input signal applied to one of the input switch diodes causes the control device to scan input terminals connected to the input switches so as to determine which switch has been activated.

32. A universal garage door opener (10) comprising:

a receiver antenna (18,64) responsive to a modulated carrier frequency signal;

a detector (22,78) responsive to the modulated carrier frequency signal from the receiver antenna (18,64), said detector (22,78) demodulating the carrier frequency signal and providing a demodulation signal indicative of the modulation of the carrier frequency signal;

a frequency synthesizer (34,96) including a dual modulus prescaler divider chain and being responsive to the modulated carrier frequency signal from the receiver antenna (18,64), said frequency synthesizer (34,96) providing a phase detect output signal indicative of the frequency of the carrier frequency signal;

a pluses stretcher diode (124) responsive to the phase detect output signal, said stretcher diode (124) stretching pulses in the phase detect output signal to provide enhanced detection capabilities; and a control device (12,90) responsive to the demodulation signal from the detector (22,78) and the phase detect output signal from the frequency synthesizer (34,96), said control device (12,90) controlling the operation of the frequency synthesizer (34,96) for dividing down the modulated carrier frequency signal by the divider chain until the divided carrier signal is within a predetermined resolution range of a divided reference frequency signal from the divider chain.

33. The universal garage door opener according to claim 32 further comprising a flip flop device, said flip flop device being responsive to the demodulation signal from the detector as a clock signal and the phase detect output signal from the frequency synthesizer, said flip flop device holding the output signal from the synthesizer over consecutive clock pulses in the clock signal and applying the phase detect output signal from the synthesizer to the control device.

34. A method of decoding the frequency of a frequency signal including a stream of consecutive pulses, said method comprising the steps of:

providing a circuit that is responsive to the frequency signal;

determining a shortest pulse width of the frequency signal from one waveform transition to a next waveform transition over a predetermined period of time, said step of determining the shortest pulse width including measuring both positive going pulse widths and negative going pulse widths;

selecting a sampling frequency within the circuit that has a rate that is faster than one half of the shortest pulse width so as to stretch the width of the pulses in the frequency signal to create stretched pulses;

representing the shortest pulse width as two samples in a memory of the circuit as a basis function in order to represent the stream of consecutive pulses in terms of the basis function;

determining whether there is an even number or an odd number of consecutive high or low samples for a particular pulse width; and remapping the frequency signal to the time base of the circuit by removing the stretched pulses from the frequency signal.

35. The method according to claim 34 wherein the frequency signal is a signal from a garage door opener.

* * * * *